Patented Apr. 29, 1952

2,594,283

UNITED STATES PATENT OFFICE 2,594,283

PROCESS FOR THE PREPARATION OF INOCULUM FOR USE IN THE FERMENTATIVE PRODUCTION OF SODIUM GLUCONATE

Russell H. Blom, Peoria Heights, and Virgil E. Sohns and Andrew J. Moyer, Peoria, Ill., assignors to the United States of America as represented by the Secretary of Agriculture No Drawing. Application December 29, 1949, Serial No. 135,852

3 Claims. (Cl. 195—81)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of sodium gluconate by fermentation, and relates more particularly to the preparation of an inoculum with which fermentation media may be inoculated. It has among its objects the provision of a method for reducing the time and labor in the production of sodium gluconate by avoiding the direct use of spores as a means of inoculation. Another object is the preparation of a germinated inoculum of gluconic acid-producing organisms particularly mold organisms adapted for the fermentative production of sodium gluconate.

The fermentative production of sodium gluconate, as described and claimed in the copending application of Crocker, Moyer and Pfeifer, Serial No. 137,901 filed January 10, 1950 involves the use of sodium bases as a means for controlling the hydrogen ion concentration of the fermenting media.

The fermentations may be inoculated in a variety of ways. For example, sporulated surface cultures of the gluconic acid-producing organism may be prepared, the spores suspended in water, and this suspension of spores added to the sterile medium. Alternatively, in the course of production the filtered mycelium from previous fermentation may be employed to inoculate subsequent media.

Both of these two methods possess practical disadvantages which add greatly to the cost of the sodium gluconate. If suspension of spores are employed, a large quantity is necessary. The preparation of the spore suspensions is tedious, requires a large number of individual flasks of spores and is time-consuming. Moreover, the necessary incubation period for the spores decreases considerably the capacity of the production fermentation equipment. The second method, i. e., re-use of the filtered mycelium eliminates some of the difficulty by avoiding the incubation periods and the use of spore suspensions for each fermentation, but is also accompanied by practical difficulties and expense of handling the filtered mycelium. Furthermore, the mycelium cannot be re-used indefinitely, and periodic inoculation of production baths with spore suspensions is therefore necessary.

A further alternative for inoculating production fermentations is the use of a special medium in which is produced a germinated inoculum. The special medium is inoculated with a suspension of spores and incubated under conditions which induce germination of the spores. This alternative has been described in connection with the production of calcium gluconate (Moyer et al., Ind. and Eng. Chem. 29,777; Wells et al., ibid. 653), and has been employed in the gallic-tannic acid fermentation and in penicillin production. The use of a germinated inoculum possesses many advantages, a major one being markedly decreased initial lag period in the production fermentation.

Gluconic acid-producing fermentations by molds differ from many other fermentations in that the activity of the organisms, i. e., the ability to produce gluconic acid is impaired by excessive acidity. If the acidity occurs in the inoculum, the detrimental effect extends to the subsequent production fermentation. Thus, if free gluconic acid is present in sufficient amounts in either the inoculum or the production medium, the rate of further acid production will approach zero. This phenomenon is caused, it is believed, by inactivation of the oxidative enzyme system of the mold by exposure of the organism or the enzymes to excessive acidic conditions.

In the work of Moyer et al., previously noted, it was disclosed that the pH of the medium used for germination can be controlled by the addition of calcium carbonate. For many purposes, however, including the production of sodium gluconate by direct fermentation, the presence of calcium ions in the medium is detrimental.

It is also indicated in the Moyer publication that satisfactory inoculum can be prepared without the use of calcium carbonate if the supply of oxygen is limited. However, in this previous work a high concentration of spores per unit volume of germination medium was employed. Under these conditions, employing shaker flasks, a satisfactory inoculum was prepared in which the pH did not fall below 4.4 in a medium containing no added buffering agency. A slight reduction in the number of ungerminated spores per unit volume of germination medium was made by Moyer et al. Reducing the number of spores by 30 percent Moyer et al. noted that there was practically no change in the total mycelial growth or the fermentation activity of the inoculum.

The present invention rests in part upon the discovery that the mycelial growth from a greatly restricted number of original spores, if produced in accordance with this invention, can be employed as a satisfactory inoculum and is fully as effective as previously known inoculant media. Applicants have discovered that one unit weight of mycelium grown from a given number of spores under conditions permitting great mycelial growth per spore is equivalent in gluconic acid-producing capacity to the same weight of mycelium of the prior art, obtained from a relatively limited growth of say, 30 times as many spores. Utilizing their discovery, applicants provide a process for preparing a germinated inoculum which permits a great saving in the net number of spores required to conduct the production fermentation.

The present invention is therefore distinguished from prior processes in that it permits a reduction in the required number of ungerminated spores, far beyond that previously known. The preparation and handling of seed flasks is a highly technical and costly operation, and applicants' process reduces the required number of spores to one-thirtieth of the amount required by the best previously known methods. When large-scale fermentations are considered, this economy in spores is reflected in a greatly reduced number of seed flasks required and a substantial saving in cost and labor.

We have found that the mycelial growth per spore is large when germination and growth occurs in the absence of an added buffering agency and under suitable nutrient conditions and conditions of submerged aeration with limited oxygen supply, and, moreover, that this large mycelial growth may be used as a satisfactory inoculum if the time of incubation and the oxygen supply are so balanced that the pH of the germination medium remains above 4.5. The oxygen supply can be controlled by varying the air pressure used in aeration, by varying the intensity of mechanical stirring, if any is employed, and by varying the volume of air blown through the medium. The time of incubation which should approximate 24 hours for convenience, may be shortened or lengthened within a fairly wide range. Balancing the time and rate of oxygen supply is a fairly simple matter since the acidity increases, i. e., the pH value decreases, with increased oxygen and increased time.

For our own purposes we arbitrarily set the time for incubation at approximately 20 to 30 hours. This time range is specified herein, since it represents a convenient mode of practicing the invention. It is to be understood that other predetermined times may be employed or alternatively one may hold constant at a predetermined value the rate of oxygen supply.

Employing conventional equipment we have found that, with air as the source of oxygen, at atmospheric pressure, the pH will be maintained within the desired range at aeration rates of 0.1 to 0.35 volume of air per volume of medium per minute. The greater rate of aeration will be correlated with a correspondingly lesser time and vice versa. With the time range arbitrarily fixed at 20 to 30 hours the pH of the medium can be controlled by careful regulation of the air so that the spores germinate and grow rapidly to produce a highly active inoculum. In contrast to what would be expected, the pH of the final germinated medium can be maintained above a value only slightly less than the initial value, and it is still within the range suitable for good vegetative growth of the gluconic acid-producing mold organisms.

If a surplus of air is provided, the pH decreases at a rate which brings it to a value injurious to the enzyme system of the organism and to the ability of the organisms to produce the enzymes needed for the subsequent conversion of glucose to gluconic acid. The critical pH at which inactivation begins to occur appears to be about 4.0 to 4.5. If a deficiency of air is provided, poor germination of spores and poor growth of mycelium may result.

In an analogous manner, as previously noted, the time may be varied with any given rate of oxygen supply, but in general the rate of oxygen supply is relatively low. As germination proceeds, the pH falls slowly, and the germinated medium is ready for use as an inoculum when the limiting value of 4.5 is reached.

The nutrient medium we employ is characterized by a relatively low carbohydrate level, of the order of 3 to 12 percent. Germination temperatures for our process fall within the range of 20° to 35° C. These conditions are typical of germination media relating to gluconic acid fermentation processes.

The following experimental data illustrates our invention.

Fifty gallons of germination medium of the following composition was prepared and sterilized in a closed tank equipped with a sparger for the introduction of air.

TABLE I

Composition of inoculum medium

| | Percent |
|---|---|
| Glucose | 5.0 |
| Corn steep liquor (as received) | 0.5 |
| $MgSO_4 \cdot 7H_2O$ | 0.02 |
| $KH_2PO_4$ | 0.02 |
| Urea | 0.01 |
| $(NH_4)_2HPO_4$ | 0.04 |

After the nutrient solution was cooled, it was inoculated with a suspension of spores of *Aspergillus niger* and the medium was aerated at the rate of 0.2 volume of air per volume of medium per minute. At the end of 24 hours, an excellent growth of vegetative cells was obtained. Three separate experiments were carried out, and the pH of the medium decreased only slightly during the incubation period as is shown by the following table.

TABLE II pH of medium

| Run No. | Initial | Final—24 hr. |
|---|---|---|
| SG-18 | 6.25 | 5.6 |
| SG-19 | 6.30 | 4.8 |
| SG-20 | 6.55 | 4.9 |

The critical pH at which inactivation of the enzyme system begins appears to be about 4.0 to 4.5. Our process therefore produces an inoculum which has not been injured by subjection to conditions of too high acidity. The utility of the inocula is illustrated by the following pilot-plant data. The composition of the sodium gluconate production medium after inoculation with varying amounts of our germinated inoculum was as follows:

TABLE III

Composition of production medium

|  | Percent |
|---|---|
| Commercial glucose | 23.5 |
| Corn steep liquor (as received) | 0.44 |
| $MgSO_4 \cdot 7H_2O$ | 0.02 |
| $KH_2PO_4$ | 0.02 |
| Urea | 0.01 |
| $(NH_4)_2HPO_4$ | 0.04 |

The fermentations were considered complete when the residual sugar content of the medium was 0.2 percent or less. The results of the fermentations are tabulated below.

TABLE IV

| Run No. | Inoculum quantity | | Fermentation time | | Rate of sugar utilization-per cent sugar utilized/hr. | |
|---|---|---|---|---|---|---|
| | gal. | per cent | Lag period, hr. | Total time, hr. | max. | average |
| SG-18 | 22.5 | 15 | 4 | 17.5 | 1.68 | 1.60 |
| SG-20 | 15 | 10 | 5 | 19 | 1.60 | 1.52 |
| SG-19 | 7.5 | 5 | 5 | 22 | 1.30 | 1.18 |

We have found that 10 percent by volume of our inoculum is sufficient for fast and complete fermentation of glucose to gluconic acid, in the form of sodium gluconate. Since this quantity of culture was produced from the equivalent of 66 sq. cm. of sporulated surface cultures, it follows that only 20 flasks of spores would be required to produce inoculum for a commercial scale fermentation of 5000-gallon batches. This compares with 327 flasks when the germinated spores, prepared by the method of the literature references referred to above, are used; or 1000 flasks when spores are employed directly as the inoculum.

We claim:

1. A method for the production of a germinated inoculum of gluconic acid-producing mold organisms suitable for inoculating sodium gluconate fermentation media which comprises inoculating a nutrient medium comprising 3 to 12 percent glucose with spores of a gluconic acid-producing mold, incubating the nutrient medium under conditions of submerged aeration until sufficient growth of vegetative cells is obtained, and maintaining the pH of the medium above 4.5 by controlling the rate of aeration.

2. Process according to claim 1 in which the rate of aeration is between 0.1 and 0.35 volume of air per volume of medium per minute.

3. A method for the production of a germinated inoculum of Aspergillus niger which comprises inoculating a nutrient medium comprising 3 to 12 percent glucose with spores of Aspergillus niger, incubating the nutrient medium for a period of 20 to 30 hours under conditions of submerged aeration and maintaining the pH of the medium above 4.5 by controlling the rate of aeration.

RUSSELL H. BLOM.
VIRGIL E. SOHNS.
ANDREW J. MOYER.

REFERENCES CITED

The following references are of record in the file of this patent:

UNITED STATES PATENTS

| Number | Name | Date |
|---|---|---|
| 2,277,716 | Lockwood | Mar. 21, 1942 |
| 2,351,500 | Moyer | June 13, 1944 |
| 2,454,753 | Hager | Nov. 23, 1948 |

OTHER REFERENCES

Moyer et al., Ind. & Eng. Chem., July 1937, pp. 777–781.

Wells et al., Ind. & Eng. Chem., June 1937, pp. 653–656.